(12) United States Patent
Aiba et al.

(10) Patent No.: US 6,831,146 B2
(45) Date of Patent: Dec. 14, 2004

(54) RESIN COMPOSITION FOR USE IN MANUFACTURING WET FRICTION MATERIALS AND WET FRICTION MATERIAL

(75) Inventors: Hiroshi Aiba, Tokyo (JP); Masahiro Mori, Shizuoka (JP)

(73) Assignees: Sumitomo Bakelite Company Limited, Tokyo (JP); NSK-Warner K.K., Tokyo (JP)

( * ) Notice: Subject to any disclaimer, the term of this patent is extended or adjusted under 35 U.S.C. 154(b) by 0 days.

(21) Appl. No.: 10/403,533

(22) Filed: Mar. 31, 2003

(65) Prior Publication Data

US 2004/0006192 A1 Jan. 8, 2004

(30) Foreign Application Priority Data

Mar. 29, 2002 (JP) ........................................ 2002-096054

(51) Int. Cl.$^7$ .............................................. C08G 14/04
(52) U.S. Cl. .......................... 528/129; 528/137; 524/33; 524/34; 523/156
(58) Field of Search ................................. 528/129, 137; 524/33, 34; 523/156

(56) References Cited

U.S. PATENT DOCUMENTS 5,529,666 A * 6/1996 Yesnik ........................ 162/136

* cited by examiner

*Primary Examiner*—Duc Truong
(74) *Attorney, Agent, or Firm*—Harness Dickey & Pierce P.L.C.

(57) ABSTRACT

A resin composition for wet friction materials contains as a main component a phenolic resin formed as a result of the reaction between phenols and aldehydes in the presence of a basic catalyst, and a particulate filler having a specific surface area of 35 to 410 m$^2$/g as an additive. A wet friction material is formed using the resin composition for wet friction materials described above as a binder. The thus formed wet friction material exhibits a small initial rate of change in friction coefficient, a large positive gradient of $\Delta\mu$-V characteristic, and excellent durability.

20 Claims, 2 Drawing Sheets

RESIN COMPOSITION FOR USE IN MANUFACTURING WET FRICTION MATERIALS AND WET FRICTION MATERIAL

BACKGROUND OF THE INVENTION

1. Field of the Invention

This invention relates to a resin composition for use in manufacturing wet friction materials, and a wet friction material manufactured using the resin composition.

2. Description of the Prior Art

In automatic transmissions of vehicles and the like, wet friction materials are used. Generally, such an automatic transmission is provided with a multi-plate clutch in which a plurality of friction plates having wet friction materials are arranged in an alternate relation with separator plates which serve as friction mating members. Each of the friction plates is formed by adhering wet friction materials to both surfaces of a metallic core plate. Each of the separator plates is formed from a single plate such as a metallic plate. The multi-plate clutch is operative in ATF (automatic transmission fluid) which is used as a lubricant to transmit power or cut off power transmission by engaging these friction plates and separator plates or releasing the engagement therebetween.

A typical example of such a wet friction material which is used in oil (ATF) is a paper-based wet friction material which is also called as a paper friction material. In general, such a paper-based wet friction material is manufactured as follows. First, a paper body is made in a wet method using natural pulp fibers, organic synthetic fibers, inorganic fibers, and the like as a fibrous base material, and diatomite, cashew gum, and the like as a filler and a friction adjusting material. Then, a binder made of a thermosetting resin is impregnated into the thus formed paper body, and the thermosetting resin-impregnated paper body is then cured by heating, to thereby obtain a paper-based wet friction material.

In such a paper-based wet friction material, a thermosetting resin which is impregnated into a paper body as a binder has a function of keeping the binding among the fibrous base material and the filler and the like. Moreover, the thermosetting resin affects the frictional properties and the durability of a resultant wet friction material. As for such a binder, an unmodified phenolic resin is commonly used since the use of such a resin enables a resultant wet friction material to have good heat resistance and compressive fatigue properties and high physical strength.

However, a wet friction material manufactured using such an unmodified phenolic resin as a binder involves the following problem. Namely, since an unmodified phenolic resin has a high cross-linking density when cured, a wet friction material manufactured using such a resin becomes too rigid and therefore such a wet friction material causes uneven abutment with a separator plate when used. Consequently, the friction coefficient of such a wet friction material is small in the initial stage of use, but is gradually increased as the wet friction material is being used because a frictional surface of the wet friction material gradually becomes even. That is, the initial rate of change in friction coefficient of such a wet friction material becomes necessarily large. As a result, an additional process for making the surface of a wet friction material even is required in manufacturing process so that the wet friction material can exhibit a predetermined friction coefficient from the initial stage of use.

In recent years, researches on modified phenolic resins have been actively conducted in order to overcome such a problem, and as a result, an oil modified phenolic resin, an epoxy modified phenolic resin, and the like which exhibit excellent flexibility have been developed, and they are practically used in some wet friction materials. However, a problem exists with such modified phenolic resins in that wet friction materials manufactured using such modified phenolic resins are inferior to wet friction materials manufactured using an unmodified phenolic resin in heat resistance and compressive fatigue properties. As of now, a modified phenolic resin capable of manufacturing wet friction materials having satisfactory durability has not yet been realized. In addition, such a wet friction material manufactured using a modified phenolic resin is liable to exhibit $\Delta\mu$-V characteristic (friction coefficient–velocity) with negative gradient, thus resulting in the case that shift shock is caused when used in a clutch. Consequently, a high demand exists for a wet friction material which exhibits a small initial rate of change in friction coefficient, a large positive gradient of $\Delta\mu$-V characteristic, and high durability.

SUMMARY OF THE INVENTION

It is therefore an object of the present invention to provide a resin composition for use in manufacturing wet friction materials (hereinafter, simply referred to as a "resin composition for wet friction materials") which enables a resultant wet friction material to exhibit a small initial rate of change in friction coefficient, a large positive gradient of $\Delta\mu$-V characteristic, and high durability.

Also, it is another object of the present invention to provide a wet friction material which exhibits a small initial rate of change in friction coefficient, a large positive gradient of $\Delta\mu$-V characteristic, and high durability.

In order to achieve the stated objects, the present invention is directed to a resin composition for wet friction materials, which comprises a phenolic resin contained as a major component, the phenolic resin being formed as a result of the reaction between phenols and aldehydes in the presence of a basic catalyst, and a particulate filler contained as an additive, the filler having a specific surface area of 35 to 410 m$^2$/g.

It is preferred that the resin composition for wet friction materials of the present invention further comprises a coupling agent. Further, the coupling agent is preferably a silane coupling agent.

Also, it is preferred that the resin composition for wet friction materials of the present invention further comprises a surfactant.

In the present invention described above, it is preferred that the phenolic resin is obtained by reacting the phenols and the aldehydes in a mole ratio (aldehydes/phenols) of 0.8 to 1.6.

Further, the weight average molecular weight of the phenolic resin is preferably equal to or less than 1,000, and the water percentage of the phenolic resin is preferably equal to or higher than 200%.

Furthermore, it is also preferred that the particulate filler is formed from at least one selected from the group including metallic oxide, metallic carbide, and metallic nitride. Further, the metallic oxide is preferably silicon dioxide having a silanol group concentration of equal to or less than 3 SiOH/nm$^2$.

Moreover, an average particle size of a primary particle of the particulate filler is preferably within the range of 5 to 50 nm.

Moreover, it is preferred that the particulate filler includes particles of which surfaces are treated with at least one selected from the group including halogenated silanes, alkoxysilanes, silazanes, and siloxanes.

Moreover, the amount of addition of the particulate filler is preferably 0.5 to 10 wt % relative to the solid content of the phenolic resin.

Moreover, the median diameter of particles of the particulate filler dispersed in the resin composition for wet friction materials is preferably equal to or less than 20 μm.

Another aspect of the present invention is directed to a wet friction material which comprises a paper body, and a binder impregnated into the paper body, the binder being formed of the resin composition for wet friction materials as described above.

DETAILED DESCRIPTION OF THE INVENTION

Figure 1:
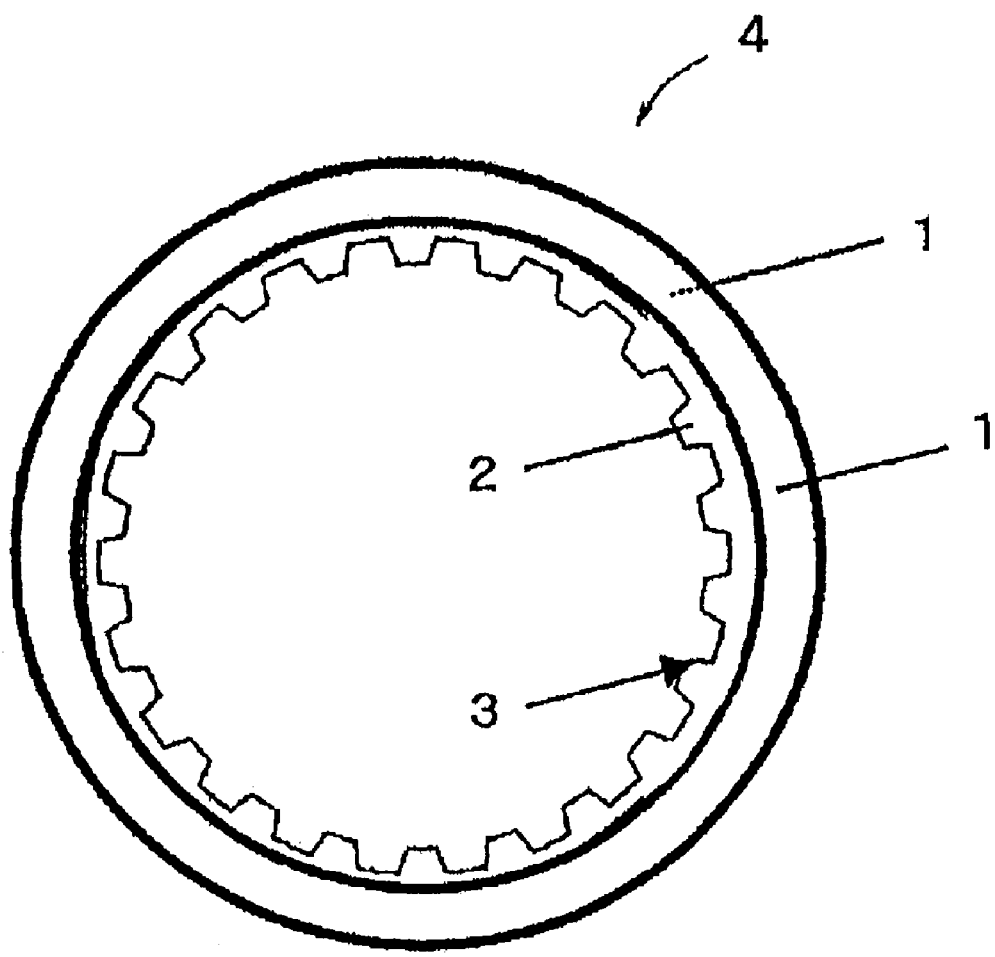
FIG. 1 is a front view which schematically shows a friction plate in which a wet friction material of the present invention is used.

A detailed description will now be made with regard to a resin composition for wet friction materials and a wet friction material according to the present invention.

The resin composition for wet friction materials of the present invention contains as a main component a phenolic resin obtained by reacting phenols and aldehydes in the presence of a basic catalyst, and also contains as an additive a particulate filler having a specific surface area of 35 to 410 m²/g. The wet friction material of the present invention is manufactured using the resin composition for wet friction materials described above as a binder.

Hereinbelow, description will be made with regard to the resin composition for wet friction materials of the present invention. As described above, the resin composition for wet friction materials of the present invention contains a phenolic resin. Such a phenolic resin can be obtained by reacting phenols and aldehydes in the presence of a basic catalyst. The thus obtained phenolic resin is a resol-type phenolic resin.

Examples of the phenols include phenol, cresol, xylenol, m-cresol, m-ethylphenol, resorcin, catechol, hydroquinone, bisphenol A, tertiarybutylphenol, octyl phenol, phenylphenol, and the like. Alternatively, a resultant substance obtained by reacting polycondensate of xylene and formaldehyde, dicyclopentadiene, an alcohol derivative of paraxylylene, tung oil, tall oil, or the like with phenols under acid conditions may be employed. These phenols may be employed alone or in combination of two or more kinds of them. Among these phenols, at least one selected from the group including phenol, cresol, and bisphenol A is preferably used. By using such phenols, it is possible to enhance the durability of a wet friction material.

Examples of the aldehydes include paraformaldehyde, formaldehyde, trioxane, acetaldehyde, benzaldehyde, glyoxal, crotonaldehyde, and the like. These aldehydes may be employed alone or in combination of two or more kinds of them. Among these aldehydes, at least one selected from the group including paraformaldehyde and formaldehyde is preferably used. By using such aldehydes, it is possible to further enhance the durability of a wet friction material.

The mole ratio between the phenols and the aldehydes in the reaction is not limited to any specific value, but is preferably in the range of 0.8 to 1.6, and more preferably in the range of 0.9 to 1.5. If the mole ratio in the reaction is less than the above lower limit value, there is a case that unreacted phenol monomers are increased. On the other hand, if the mole ratio in the reaction exceeds the above upper limit value, the cross-linking density of the resultant phenolic resin is increased so that the phenolic resin becomes excessively hard when cured, thus resulting in the case that the effect of decreasing the initial rate of change in friction coefficient of a wet friction material is lowered. In this regard, it is to be noted that a decrease in the initial rate of change in friction coefficient of a wet friction material makes it possible to obviate the need for a process for making the surface of a wet friction material even.

Examples of the basic catalyst include: alkalis such as sodium hydroxide, potassium hydroxide, barium hydroxide, calcium hydroxide, and the like; ammonia; and amines such as triethylamine, triethanolamine, and the like. These basic catalysts may be employed alone or in combination of two or more kinds of them.

The amount of addition of the basic catalyst is not limited to any specific value, but is preferably 1 to 7 parts by weight with respect to 100 parts by weight of phenols, and more preferably 2 to 5 parts by weight. By setting the amount of addition of the basic catalyst to within the above range, it is possible to obtain a phenolic resin which enables the durability of a wet friction material to be further enhanced.

Further, after the reaction between the phenols and the aldehydes in the presence of a basic catalyst, an epoxy resin may be added to the resultant substance to impart flexibility thereto. By appropriately imparting flexibility, it is possible to improve the effect of decreasing the initial rate of change in friction coefficient of a wet friction material.

The content of the phenolic resin in the resin composition for wet friction materials is not limited to any specific value, but is preferably 30 to 60 wt % of the total weight of the resin composition, and more preferably 35 to 55 wt %. If the content of the phenolic resin is less than the above lower limit value, there is a case that the amount of the resin composition adhered to a wet friction material as a binder in manufacturing the wet friction material is less than a target amount of the resin composition. On the other hand, if the content of the phenolic resin exceeds the above upper limit value, there is a case that the storage stability of the phenolic resin is lowered.

The weight average molecular weight of the phenolic resin is not limited to any specific value, but is preferably equal to or less than 1,000, more preferably in the range of 130 to 650, and most preferably in the range of 150 to 500. If the weight average molecular weight of the phenolic resin is less than the above lower limit value, there is a case that unreacted phenol monomers are increased and curing properties are also lowered. On the other hand, if the weight average molecular weight of the phenolic resin exceeds the above upper limit value, the viscosity of the resin is increased, thus resulting in the case that the impregnability of the phenolic resin into a fibrous base material is impaired. It is to be noted here that the weight average molecular weight can be determined, for example, by means of GPC (gel permeation chromatography). In this case, an analytical curve can be produced using polystyrene standard substance. A measurement by means of GPC can be performed using tetrahydrofuran as an elution solvent under the condition that a flow rate is 1.0 ml/min and a temperature of columns is 40° C. In this measurement, a measuring instrument having a product code HLC-8020, an analysis column having a product code TSKgelG1000HXL, two analysis columns having a product code TSKgelG2000HXL, and an analysis column having a product code TSKgelG3000HXL can be used (all of which are manufactured by Tosoh Corporation).

The phenolic resin is not limited to any specific one, and a water-soluble phenolic resin containing no organic solvent may also be employed. In this case, the water percentage of the phenolic resin is not limited to any specific value, but is preferably equal to or higher than 200%, and more preferably 300 to 1,000%. If the water percentage of the phenolic resin is less than the above lower limit value, there is a case that the phenolic resin is difficult to be impregnated into a fibrous base material. On the other hand, if the water percentage of the phenolic resin exceeds the above upper limit value, there is a case that the effect of enhancing the durability of a wet friction material is lowered. If the phenolic resin has a water percentage of 200% or higher, the impregnability of the resin into a fibrous base material is improved, which makes it possible to obtain a wet friction material in which the resin is more uniformly distributed in the thickness direction thereof. Such uniform distribution of the resin in a wet friction material enables pores in the wet friction material to be uniformly distributed, thereby enhancing a cooling effect for lowering the surface temperature of the wet friction material that would be elevated due to sliding. Consequently, the durability of the wet friction material can be further enhanced.

It is to be noted that the term "water percentage" described in the above refers to a total amount of pure water added to the phenolic resin until a mixture of the pure water and the phenolic resin becomes white (milkiness), which is represented as a percentage (the temperature of the mixture is 25° C.). Specifically, the water percentage is obtained as follows. First, 10 cc of phenolic resin is sampled in a beaker, and the temperature of the resin is adjusted to 25° C. Then, pure water at 25° C. is added to be mixed with the phenolic resin. The addition of pure water is continued until a mixture of the pure water and the phenolic resin becomes white (milkiness). The water percentage is determined based on the total amount of added pure water (cc) at that time, and practically, it is determined based on the following formula.

Water percentage (%)=100×(amount of added pure water until mixture becomes white (cc))/10

As described above, the resin composition for wet friction materials of the present invention further contains a particulate filler having a specific surface area of 35 to 410 m$^2$/g as an additive. By containing such a particulate filler as an additive, it is possible to decrease the initial rate of change in friction coefficient of a wet friction material, and it is also possible to improve the positive gradient of $\Delta\mu$-V characteristic and the durability of a wet friction material. It is to be noted that a detailed description with regard to the initial rate of change in friction coefficient, $\Delta\mu$-V characteristic, and durability will be made later.

As for a method for preparing silica, one example includes a wet method using a hydrolyzate of alkoxysilane. In manufacturing a conventional resin composition for wet friction materials, silica is prepared using such a wet method in manufacturing process, and the thus prepared silica is dispersed in the manufactured resin composition. However, a problem exists with silica prepared using such a wet method in that it has high moisture absorbency due to its high concentration of silanol groups. As a result, a wet friction material manufactured using a resin composition in which such silica is dispersed is liable to be swelled, which results in lowering in the strength and the durability of the manufactured wet friction material.

In contrast, the present invention does not employ any process like the wet method in the manufacturing process of the resin composition. In the present invention, since a particulate filler which has been already prepared is added as an additive, such a problem as described above will not arise. Accordingly, it is possible to decrease the initial rate of change in friction coefficient of a wet friction material, and it is also possible to improve the positive gradient of $\Delta\mu$-V characteristic and the durability of a wet friction material. By using such a wet friction material having an improved positive gradient of $\Delta\mu$-V characteristic in a clutch, shift shock can be prevented.

As described above, the specific surface area of the particulate filler is in the range of 35 to 410 m$^2$/g, but is preferably in the range of 75 to 330 m$^2$/g, and more preferably in the range of 90 to 200 m$^2$/g. If the specific surface area of the particulate filler is less than the above lower limit value, the particulate filler is nonuniformly dispersed in the resin, thus resulting in the case that the strength of a wet friction material is lowered. On the other hand, if the specific surface area of the particulate filler exceeds the above upper limit value, the particulate filler becomes excessively porous, thus resulting in the case that the strength of a wet friction material is lowered. If the specific surface area of the particulate filler is within the above range, the initial rate of change in friction coefficient of a resultant wet friction material can be decreased, even if the amount of the filler contained in the resin composition is small since such a filler is bulky.

Examples of the particulate filler include: metallic oxide such as silicon oxide, silicon dioxide, zinc oxide, titanium oxide, aluminum oxide, cerium oxide, yttrium oxide, iron oxide, and the like; metallic nitride such as silicon nitride, aluminum nitride, boron nitride, and the like; and metallic carbide such as silicon carbide, titanium carbide, boron carbide, chromium carbide, tungsten carbide, and the like. Among them, oxide such as silicon oxide, silicon dioxide, aluminum oxide, and the like is preferred.

When particles of the particulate filler have hydroxyl groups on their surfaces, the density of hydroxyl group is not limited to any specific value, but is preferably equal to or less than 5 OH/nm$^2$, more preferably equal to or less than 3 OH/nm and most preferably equal to or less than 1 OH/nm$^2$. If the hydroxyl group density exceeds the above upper limit value, unsatisfactory dispersion of the particulate filler is liable to occur, thus resulting in the case that the durability of a wet friction material is lowered.

As for such a filler, silicon dioxide having low surface silanol group concentration which can be obtained by flame hydrolysis, especially silicon dioxide having a silanol group concentration (density) of 3 SiOH/nm$^2$ or less, is preferred. By using such a filler, it is possible to further enhance the durability of a wet friction material. Further, since the moisture absorbency of a cured resin composition for wet friction materials has an effect on deterioration of a wet friction material, if the surface silanol group concentration of silicon dioxide is high, a resultant wet friction material exhibits high moisture absorbency, thus resulting in acceleration of deterioration of the wet friction material. Based on such findings, in the present invention, the surface silanol group concentration of silicon dioxide is made to be low to prevent a wet friction material from being deteriorated.

The average particle size of a primary particle of the particulate filler is not limited to any specific value, but is preferably 5 to 50 nm, and more preferably 7 to 30 nm. If the average particle size of a primary particle is less than the above lower limit value, there is a case that it is difficult to disperse the particulate filler because the particulate filler is very small in size so that agglomeration is liable to occur. On the other hand, if the average particle size of a primary particle exceeds the above upper limit value, the size of the particulate filler is too large to satisfactorily disperse, thus resulting in the case that a resultant wet friction material can not exhibit stable friction coefficient.

The amount of addition of the particulate filler is not limited to any specific value, but is preferably 0.5 to 10 wt % relative to the solid content of the phenolic resin, and more preferably 1 to 7 wt %. If the amount of addition is less than the above lower limit value, there is a case that the effect of decreasing the initial rate of change in friction coefficient of a wet friction material, and the effect of satisfactorily improving the positive gradient of $\Delta\mu$-V characteristic and the durability of a wet friction material can not be obtained. On the other hand, if the amount of addition exceeds the above upper limit value, there is a case that a resultant wet friction material does not exhibit stable friction coefficient.

It is preferred that the surface of the particulate filler is treated with a silane compound, but not limited thereto. By doing so, it is possible to facilitate dispersion of the particulate filler.

Examples of such a silane compound include halogenated silanes, alkoxysilanes, silazanes, siloxanes, and the like. Among these silane compounds, halogenated silanes and/or alkoxysilanes are preferred. By using such a silane compound, it is possible to further facilitate dispersion of the particulate filler.

The median diameter of the dispersing particulate filler is not limited to any specific value, but is preferably equal to or less than 20 $\mu$m, and more preferably equal to or less than 1 $\mu$m. If the median diameter exceeds the above upper limit value, the particulate filler will not satisfactorily disperse, thus resulting in the case that a resultant wet friction material can not exhibit stable friction coefficient.

In the resin composition for wet friction materials of the present invention, it is preferred that a coupling agent is further added thereto. By adding a coupling agent, it is possible to further enhance the durability of a wet friction material.

Examples of the coupling agent include $\gamma$-glycidoxypropyltrimethoxysilane, $\beta$-(3,4-epoxycyclohexyl) ethyltrimethoxysilane, and an aqueous solution of $\gamma$-aminopropyltriethoxysilane, and the like. Among these coupling agents, at least one is preferably selected from the group including $\gamma$-glycidoxypropyltrimethoxysilane and $\beta$-(3,4-epoxycyclohexyl) ethyltrimethoxysilane. By adding such a coupling agent, it is possible to enhance the strength of the resin composition for wet friction materials as a binder. The amount of addition of the coupling agent is not limited to any specific value, but is preferably 0.1 to 5 wt % relative to the solid content of the resin composition for wet friction materials, and more preferably 0.3 to 3 wt %. By setting the amount of addition of the coupling agent to within the above range, it is possible to enhance the strength of a wet friction material.

Further, in the resin composition for wet friction materials of the present invention, it is also preferred that a surfactant is further added thereto. By adding a surfactant, it is possible to facilitate dispersion of the particulate filler. Examples of the surfactant include an anionic surfactant, a nonionic surfactant, a cationic surfactant, and the like. Among these surfactants, an anionic surfactant is preferred. By adding such a surfactant, it is possible to further facilitate dispersion of the particulate filler.

The amount of addition of the surfactant is not limited to any specific value, but is preferably 0.1 to 3 wt % relative to the solid content of the resin composition for wet friction materials after adding the coupling agent, and more preferably 0.3 to 1 wt %. By setting the amount of addition of the surfactant to within the above range, it is possible to facilitate dispersion of the particulate filler.

One example of a method for adding the particulate filler to the phenolic resin or the like involves dispersing and mixing the particulate filler in and with the phenolic resin using a dispersing and mixing apparatus such as a homomixer, a disperser, a bead mil, a filmics, a high-pressure homogenizer, an ultrasonic generator, and the like. Alternatively, the particulate filler may be in advance added to either phenols or aldehydes to disperse and mix in and with a phenolic resin synthesized as a result of the reaction between the phenols and the aldehydes. Also, water or an organic solvent in which the particulate filler is highly dispersed may be added to the phenolic resin.

Next, description will be made with regard to the wet friction material of the present invention.

As described above, the wet friction material of the present invention is manufactured using the resin composition for wet friction materials described above as a binder.

The wet friction material of the present invention is used for a friction plate, for example, in which the wet friction material is adhered to a core plate. A detailed description will now be made with reference to the drawings. As shown in FIG. 1, a wet friction material 1, which is formed into a ring shape, is adhered to each side of a core plate 3 using an adhesive to obtain a friction plate 4. On the inner circumferential portion of the core plate 3, there is formed with a gear 2 which is to be engaged with a hub of a mating part (not shown). A plurality of friction plates 4 which constitute a wet multi-plate clutch can be freely moved in the axial direction through the gears 2. In such a wet multi-plate clutch, separator plates (not shown) are arranged in an alternate relation with the friction plates 4 so that the friction plates 4 frictionally engage with the separator plates to transmit power.

When the resin composition for wet friction materials of the present invention is used as a binder, a wet friction material is manufactured by impregnating a paper body made of a fibrous base material with the resin composition for wet friction materials and then curing the resin composition-impregnated paper body. The paper body is manufactured through a common papermaking process employing a fibrous base material (an organic fibrous base material and/or an inorganic fibrous base material).

Examples of the fibrous base material include: organic fibers such as natural pulp fibers, aramid fibers, and the like; and inorganic fibers such as carbon fibers, glass fibers, and the like. Further, the paper body may include a filler. Examples of the filler include silica, cashew gum, rubber particles, activated carbon, and diatomite. Examples of a method for impregnating the paper body with the resin composition for wet friction materials include: immersion of the paper body into the resin composition for wet friction materials; coating of the resin composition for wet friction materials on the paper body using various kinds of coater; and spraying the resin composition for wet friction materials to the paper body using a spray. Among these methods, the method of immersing the paper body into the resin composition for wet friction materials is preferably employed. By using this method, it is possible to facilitate impregnation of the resin composition for wet friction materials into the paper body. After impregnation of the resin composition for wet friction materials into the paper body, the resin composition-impregnated paper body is generally dried at a temperature of 80 to 120° C. for 5 to 30 minutes, and is then heated at a temperature of 150 to 230° C. for 10 to 50 minutes to effect curing.

The porosity of the wet friction material of the present invention is not limited to any specific value, but is preferably 20 to 70%, and more preferably 30 to 60%. If the porosity is less than the above lower limit value, there is a case that the effect of enhancing the durability of the wet friction material is decreased because the efficiency of the action of absorbing and discharging ATF in and out of the wet friction material is decreased. On the other hand, if the porosity exceeds the above upper limit value, there is a case that the strength of the wet friction material is lowered.

As has been described above, the wet friction material of the present invention simultaneously achieves a decrease in the initial rate of change in friction coefficient and improvements in the positive gradient of $\Delta\mu$-V characteristic and in durability, which are required for a wet friction material, by adding a fine particulate filler into the phenolic resin. In this regard, it is to be noted that the initial rate of change in friction coefficient refers to a rate of change between friction coefficient at the time of engagement at 1st cycle and friction coefficient at the time of engagement at 200th cycle, and is practically determined based on the following formula.

Initial rate of change in friction coefficient (%)=100×{(friction coefficient at 200th cycle)−(friction coefficient at 1st cycle)}/friction coefficient at 1st cycle Further, $\Delta\mu$-V characteristic refers to the dependence of the amount of change in friction coefficient on velocity. $\Delta\mu$-V characteristic with a positive gradient represents that the amount of change in friction coefficient is increased as velocity is increased.

Furthermore, durability is evaluated based on the number of cycles until peeling-off of the wet friction material occurs and the amount of thickness loss of the wet friction material after a predetermined number of cycles has elapsed.

As described above, when the phenolic resin composition of the present invention which contains a particulate filler is used as a binder in manufacturing a wet friction material, the binder is reinforced with the particulate filler when cured. This significantly contributes to a reduction in the thickness loss of the wet friction material, and an increase in the number of cycles until peeling-off of the wet friction material occurs. Further, according to the wet friction material of the present invention, a problem resulted from uneven contact with a friction mating material can be overcome due to the existence of the particulate filler on the surface of the wet friction material. Consequently, the wet friction material of the present invention can not only decrease the initial rate of change in friction coefficient but also improve the positive gradient of $\Delta\mu$-V characteristic.

EXAMPLE

Hereinbelow, a detailed description will be made with regard to the present invention based on examples and comparative examples. However, it is to be understood that the present invention is not limited thereto.

Example 1

<1> Preparation of Phenolic Resin 940 parts by weight of phenol, 895 parts by weight of 37% formalin (F/P=1.1), 20 parts by weight of ammonia water, and 10 parts by weight of 50% sodium hydroxide were put in a flask equipped with a stirrer, a reflux condenser, and a thermometer to be reacted at a temperature of 80° C. for 1 hour. Thereafter, the resultant substance was subjected to dehydration in a vacuum of 110 mmHg, and then at the time when a temperature was reached to 75° C., 370 parts by weight of methanol was added thereto. Then, the thus obtained substance was cooled, to thereby obtain a liquid phenolic resin containing a nonvolatile component of about 64.0 wt %, and having a weight average molecular weight of 358.

<2> Preparation of Resin Composition for Wet Friction Materials

The liquid phenolic resin obtained in <1> in the above was mixed with methanol and Fumed silica as a particulate filler (manufactured by TOKUYAMA Corp., with a product name of REOLOSIL and a product code of MT-10, treated by monomethyltrichlorosilane, and having an average particle size of a primary particle of about 16 nm, a specific surface area of about 120 m$^2$/g, and a silanol group density of less than 0.5 SiOH/nm$^2$) so that the concentration of the particulate filler in the nonvolatile component of a prepared resin composition for wet friction materials was 3.0 wt %, and then γ-glycidoxypropyltrimethoxysilane of 0.5 wt % for the nonvolatile component (that is, solid content) was further added thereto. The thus obtained mixed solution was dispersed using an ultrasonic generator and a high-pressure homogenizer, to thereby obtain a resin composition for wet friction materials containing a nonvolatile component of 40 wt %. The median diameter of the particulate filler in the obtained resin composition was 0.2 μm, which was measured by a laser diffraction particle size distribution analyzer (manufactured by HORIBA, Ltd. with a product code of LA 920).

<3> Manufacture of Wet Friction Material

Natural pulp fibers of 35 wt % and aramid fibers of 20 wt % were used as fibrous base materials, and diatomite of 45 wt % was added thereto as a filler and a friction adjusting material, and these substances were dispersed into water to obtain a slurry liquid. Paper was formed from the slurry liquid and then dried to obtain a paper body. The paper body was impregnated with the resin composition for wet friction materials prepared in <2> in the above, and the resin composition-impregnated paper body was dried and then cured, to thereby obtain a wet friction material comprised of 40 parts by weight of a binder and 100 parts by weight of the paper body. Next, the thus obtained wet friction material was punched out to form a ring having an outer diameter of 130 mm and an inner diameter of 100 mm. Then, the ring-shaped wet friction material was integrated with a ring-shaped metallic core plate by being held within a mold heated to 200° C., for 30 seconds at 4.9 MPa or higher pressure, to thereby obtain a friction plate having a diameter of 130 mm and a thickness of 2.3 mm.

Example 2

A wet friction material of Example 2 was manufactured in the same manner as Example 1 except that a different particulate filler was used, and a different dispersing apparatus was used.

In this Example, AEROSIL 130 (which is a name of a product manufactured by Nippon Aerosil Co., and has an average particle size of a primary particle of about 16 nm, a specific surface area of about 130 m$^2$/g, and a silanol group density of about 2 SiOH/nm$^2$) was used as a particulate filler, and an ultrasonic generator was used as a dispersing apparatus. It is to be noted that the median diameter of the particulate filler in the obtained resin composition for wet friction materials was 10 μm.

Example 3

A wet friction material of Example 3 was manufactured in the same manner as Example 1 except that a different particulate filler was used, and a different dispersing apparatus was used.

In this Example, Fumed silica (manufactured by Nippon Aerosil Co., with a product name of AEROSIL 200, and having an average particle size of a primary particle of about 12 nm, a specific surface area of about 200 m$^2$/g, and a silanol group density of about 3 SiOH/nm$^2$) was used as a particulate filler, and CLEARMIX (which is a trademark of a product manufactured by ORGANO CORPORATION) was used as a dispersing apparatus. It is to be noted that the median diameter of the particulate filler in the obtained resin composition for wet friction materials was 9 μm.

Example 4

A wet friction material of Example 4 was manufactured in the same manner as Example 1 except that a different dispersing apparatus, that is, CLEARMIX (which is a trademark of a product manufactured by ORGANO CORPORATION) was used, and that the concentration of silica in the nonvolatile component was 8.0 wt %. It is to be noted that the median diameter of the particulate filler in the obtained resin composition for wet friction materials was 14 μm.

Example 5

A wet friction material of Example 5 was manufactured in the same manner as Example 1 except that a different phenolic resin was used. A phenolic resin used in this example was prepared as follows: 940 parts by weight of phenol, 973 parts by weight of 37% formalin (F/P=1.2), and 30 parts by weight of 50% sodium hydroxide were put in a flask equipped with a stirrer, a reflux condenser, and a thermometer to be reacted at a temperature of 75° C. for 2.5 hours. Then, the resultant substance was immediately cooled to prepare a phenolic resin containing a nonvolatile component of 50 wt %, and having a water percentage of 400% and a weight average molecular weight of 180. It is to be noted that the median diameter of the particulate filler in the obtained resin composition for wet friction materials was 15 μm. Further, it is to be noted that the prepared phenolic resin composition for wet friction materials was diluted with water to a target concentration when impregnated into a base material in manufacturing wet friction materials.

Example 6

A wet friction material of Example 6 was manufactured in the same manner as Example 1 except that a different phenolic resin was used.

A phenolic resin used in this example was prepared as follows: 940 parts by weight of phenol, 895 parts by weight of 37% formalin (F/P=1.1), 20 parts by weight of ammonia water, and 10 parts by weight of 50% sodium hydroxide were put in a flask equipped with a stirrer, a reflux condenser and a thermometer to be reacted at a temperature of 80° C. for 1 hour. Thereafter, the resultant substance was subjected to dehydration in a vacuum of 110 mmHg, and at the time when a temperature was reached to 75° C., 415 parts by weight of methanol and 60 parts by weight of bisphenol A type liquid epoxy resin were added thereto to be reacted for 1 hour. Then, the thus obtained substance was cooled, to thereby obtain a liquid phenolic resin containing a nonvolatile component of about 64.3 wt % and having a weight average molecular weight of 350. It is to be noted that the median diameter of the particulate filler in the obtained resin composition for wet friction materials was 0.3 μm.

Comparative Example 1

A wet friction material of Comparative Example 1 was manufactured in the same manner as Example 1 except that only the phenolic resin was used as a binder, that is, the binder containing no particulate filler was used.

Comparative Example 2

A wet friction material of Comparative Example 2 was manufactured in the same manner as Example 1 except that a different particulate filler was used.

In this comparative example, precipitated silica (manufactured by DEGUSSA JAPAN CO. LTD., with a product name of Sipernat 500LS, and having a specific surface area of 450 m$^2$/g, an average particle size of a primary particle of about 5.5 μm, and a silanol group density of about 6 SiOH/nm$^2$) was used as a particulate filler. It is to be noted that the median diameter of the particulate filler in the obtained resin composition for wet friction materials was 30 μm. It was confirmed that the silica was precipitated in a container at its bottom after three days.

Comparative Example 3

A wet friction material of the Comparative Example 3 was manufactured in the same manner as Example 1 except that a different particulate filler was used.

In this comparative example, spherical silica in powder form (manufactured by Admatechs Co., Ltd., and having an average particle size of a primary particle of about 0.25 μm and a specific surface area of about 20 m$^2$/g) was used as a particulate filler. It is to be noted that the median diameter of the particulate filler in the obtained resin composition for wet friction materials was 26 μm.

Comparative Example 4

A wet friction material of Comparative Example 4 was manufactured in the same manner as Example 1 except that a different resin composition for wet friction materials was used.

A resin composition for use in this comparative example was prepared as follows: 208 parts by weight of tetraethoxysilane (manufactured by Nippon Unicar Co., Ltd., with a product code of TZ-3161), 150 parts by weight of ethanol, 2 parts by weight of 0.1 N hydrochloric acid and 30 parts by weight of pure water were put in a flask equipped with a stirrer, a reflux condenser, and a thermometer to be reacted at a temperature of 40° C. for 3 hours, to thereby obtain a hydrolyzate. The thus obtained hydrolyzate was mixed with the liquid phenolic resin, acid, and methanol so that the nonvolatile component of a resultant resin composition for wet friction materials was 30 wt %, to thereby obtain a resin composition for wet friction materials. It is to be noted that when the resin composition was heated at 135° C. for 1 hour to effect curing, the silica content of the cured resin composition was 30 wt %.

For each of the wet friction materials manufactured in Examples 1 to 6 and Comparative Examples 1 to 4 described above, evaluations were made for the following items. The evaluation items and evaluation methods are shown below. The results of these evaluations are shown in Tables 1 to 3.

<1> Porosity

The porosity of each of the wet friction materials was measured using an automated mercury intrusion porosimeter (manufactured by YUASA-IONICS COMPANY, LIMITED with a product name of AUTOSCAN 500).

<2> Initial Rate of Change in Friction Coefficient

The initial rate of change in friction coefficient was determined by measuring the friction coefficient of the wet friction material using a SAE#2 friction test machine under the following conditions. In this regard, it is to be noted that the initial rate of change in friction coefficient refers to a rate of change between friction coefficient at the time of engagement at 1st cycle and friction coefficient at the time of engagement at 200th cycle, and is practically determined based on the following formula.

Initial rate of change in friction coefficient (%)=100×{(friction coefficient at 200th cycle)−(friction coefficient at 1st cycle)}/friction coefficient at 1st cycle Revolution per minute: 3,600 rpm
Moment of inertia: 0.343 N·m·s$^2$
Fastening pressure: 785 kPa
Oil temperature: 100° C.
Volume of ATF: 700 ml <3> Amount of Thickness Loss An amount of thickness loss of the wet friction material was obtained by measuring the thickness of the friction plate, to which the wet friction material is adhered, prior to and subsequent to a friction test, and then determining the amount of change between them. The friction test was carried out using a SAE#2 friction test machine under the following conditions.

Revolution per minute: 3,600 rpm
Moment of inertia: 0.343 N·m·s$^2$
Fastening pressure: 785 kPa
Number of cycles: 5,000 times
Oil temperature: 100° C.
Volume of ATF: 700 ml <4> Δμ-V Characteristic The dependence of the amount of change in friction coefficient on velocity was evaluated using LVFA (Low Velocity Friction Apparatus) which is pursuant to a friction test machine defined in JASO M 349. Measurement of the friction coefficient of the wet friction material was made at a reference velocity and at each of various levels of velocity under the following conditions. The amount of change in friction coefficient was obtained by determining the amount of change between friction coefficient at a reference velocity and friction coefficient at each of the levels of velocity. It is to be noted that the amount of change in friction coefficient was determined three times, and the average thereof was actually used for evaluation. Test conditions are shown below.

Reference velocity: 0.33 m/s
Levels of velocity: 0.66, 0.99, 1.32, 1.98, 2.64, 3.30 m/s
Fastening pressure: 1,500 kPa
Oil temperature: 100° C.
volume of ATF: 500 ml/min <5> Number of Cycles Until Peeling-Off of Wet Friction Material Occurs The number of cycles until peeling-off of the wet friction material occurs was determined using a SAE#2 friction test machine. Test conditions are shown below.

Revolution per minute: 7,600 rpm
Moment of inertia: 0.123 N·m·s$^2$
Fastening pressure: 520 kPa
Oil temperature: 100° C.
Volume of ATF: 360 ml/min

TABLE 1

|  | Porosity (%) |
|---|---|
| Example 1 | 49.5 |
| Example 2 | 49.4 |
| Example 3 | 49.5 |
| Example 4 | 49.5 |
| Example 5 | 49.6 |
| Example 6 | 49.5 |
| Com. Example 1 | 49.4 |
| Com. Example 2 | 49.6 |
| Com. Example 3 | 49.6 |
| Com. Example 4 | 49.5 |

TABLE 2

|  | Initial rate of change in friction coefficient (%) | Thickness loss (μm) |
|---|---|---|
| Example 1 | 0.8 | 25 |
| Example 2 | 0.8 | 23 |
| Example 3 | 1.6 | 30 |
| Example 4 | 1.6 | 30 |
| Example 5 | 2.4 | 28 |
| Example 6 | 0 | 33 |
| Com. Example 1 | 11.4 | 42 |
| Com. Example 2 | 17.3 | 65 |
| Com. Example 3 | 14.3 | 55 |
| Com. Example 4 | 3.2 | 88 |

TABLE 3

|  | Number of cycles until peeling-off of wet friction material occurs |
|---|---|
| Example 1 | 12,000 |
| Example 2 | 11,000 |
| Example 3 | 11,000 |
| Example 4 | 9,000 |
| Example 5 | 7,000 |
| Example 6 | 12,000 |
| Com. Example 1 | 3,000 |
| Com. Example 2 | 3,000 |
| Com. Example 3 | 3,000 |
| Com. Example 4 | 2,000 |

Figure 2:
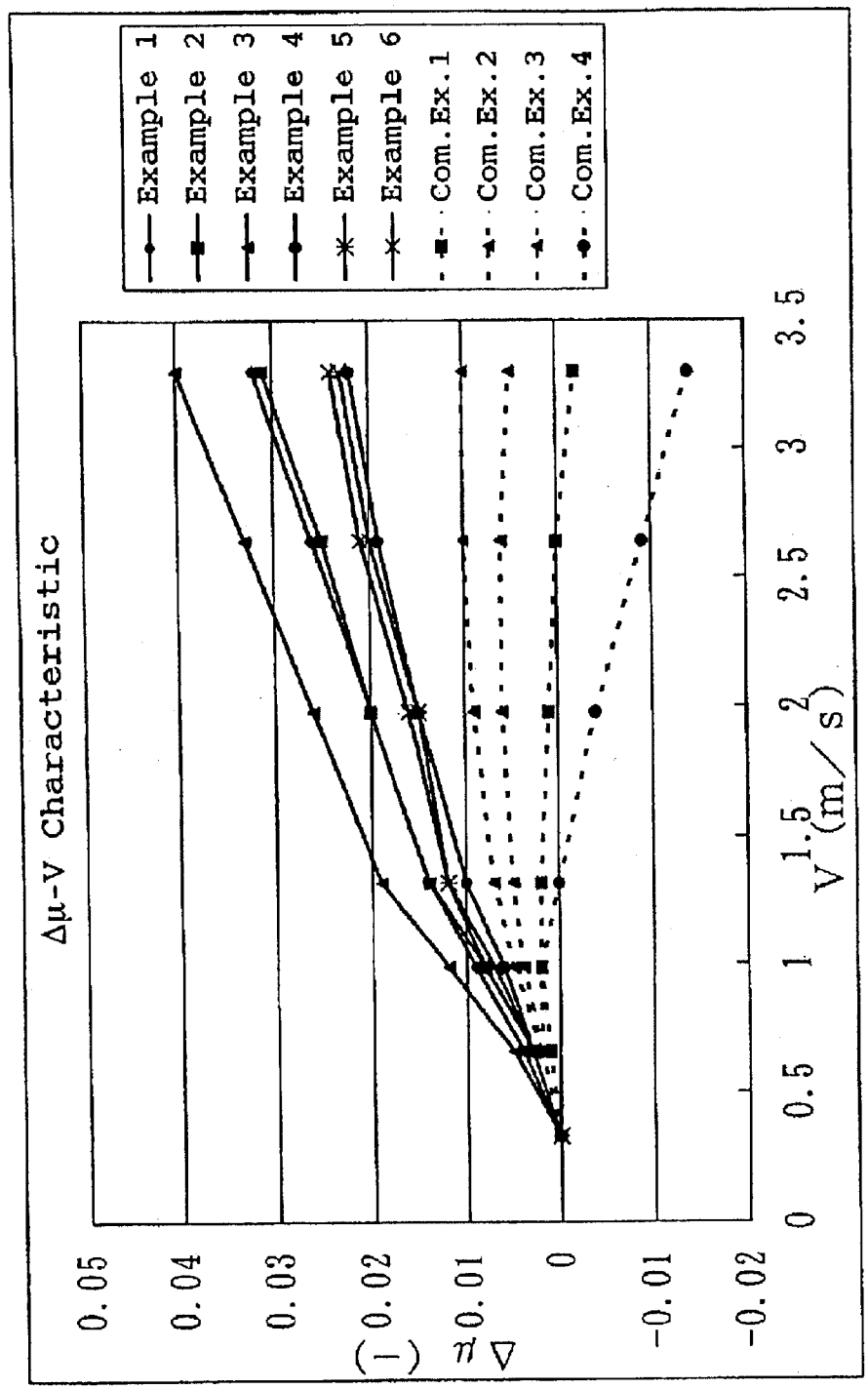
FIG. 2 is a graph which shows $\Delta\mu$-V characteristic.

As is apparent from Tables 1 and 2, each of the wet friction materials manufactured in Examples 1 to 6 exhibited a decreased initial rate of change in friction coefficient with maintaining substantially equivalent porosity to that of the wet friction materials of the Comparative Examples. Further, as is apparent from FIG. 2, each of the wet friction materials manufactured in Examples 1 to 6 exhibited an improved positive gradient of Δμ-V characteristic. This means that the amount of change in friction coefficient was increased as velocity was increased. Furthermore, as is apparent from Tables 2 and 3, the wet friction materials manufactured in Examples 1 to 6 exhibited a smaller thickness loss and a larger number of cycles until peeling-off of the wet friction material occurs as compared to the wet friction materials manufactured in Comparative Examples 1 to 4. This means that the durability of each of the wet friction materials of Examples 1 to 6 was excellent.

According to the present invention, it is possible to provide a resin composition which makes it possible for a manufactured wet friction material to have a small initial rate of change in friction coefficient, a large positive gradient of $\Delta\mu$-V characteristic, and excellent durability. By using such a resin composition in manufacturing wet friction materials, it is possible to obviate the need for a process for making the surface of the wet friction material even. Further, by using a wet friction material manufactured using such a resin composition in a clutch, it is possible to avoid shift shock.

Furthermore, when the resin composition for wet friction materials further contains a coupling agent, a resultant wet friction material exhibits especially excellent durability.

Moreover, when the resin composition for wet friction materials contains a specific metallic oxide as a particulate filler, a resultant wet friction material exhibits an especially small initial rate of change in friction coefficient.

Moreover, when the resin composition for wet friction materials contains a particulate filler having a specific average particle size of a primary particle, a resultant wet friction material exhibits an especially stable friction coefficient.

Finally, it is to be noted that the present invention is not limited to the above mentioned embodiments and examples, and it goes without saying that various changes and modifications may be made without departing from the scope of the present invention which is determined by the following claims.

What is claimed is:

1. A resin composition for wet friction materials, comprising:
    a phenolic resin contained as a major component, the phenolic resin being formed as a result of the reaction between phenols and aldehydes in the presence of a basic catalyst; and
    a particulate filler contained as an additive; the particulate filler having a specific surface area of 35 to 410 m$^2$/g.

2. The resin composition for wet friction materials as claimed in claim 1, further comprising a coupling agent.

3. The resin composition for wet friction materials as claimed in claim 1, further comprising a surfactant.

4. The resin composition for wet friction materials as claimed in claim 1, wherein the phenolic resin is obtained by reacting the phenols and the aldehydes in a mole ratio (aldehydes/phenols) of 0.8 to 1.6.

5. The resin composition for wet friction materials as claimed in claim 1, wherein the weight average molecular weight of the phenolic resin is equal to or less than 1,000.

6. The resin composition for wet friction materials as claimed in claim 1, wherein the water percentage of the phenolic resin is equal to or higher than 200%.

7. The resin composition for wet friction materials as claimed in claim 2, wherein the coupling agent is a silane coupling agent.

8. The resin composition for wet friction materials as claimed in claim 1, wherein the particulate filler is formed from at least one selected from the group including metallic oxide, metallic carbide, and metallic nitride.

9. The resin composition for wet friction materials as claimed in claim 8, wherein the metallic oxide is silicon dioxide having a silanol group concentration of equal to or less than 3 SiOH/nm2.

10. The resin composition for wet friction materials as claimed in claim 1, wherein an average particle size of a primary particle of the particulate filler is within the range of 5 to 50 nm.

11. The resin composition for wet friction materials as claimed in claim 1, wherein the particulate filler includes particles of which surfaces are treated with at least one selected from the group including halogenated silanes, alkoxysilanes, silazanes, and siloxanes.

12. The resin composition for wet friction materials as claimed in claim 1, wherein the amount of addition of the particulate filler is 0.5 to 10 wt % relative to the solid content of the phenolic resin.

13. The resin composition for wet friction materials as claimed in claim 1, wherein the median diameter of particles of the particulate filler dispersed in the resin composition for wet friction materials is equal to or less than 20 µm.

14. A wet friction material, comprising:
    a paper body; and
    a binder impregnated into the paper body, the binder being formed of the resin composition claimed in claim 1.

15. A resin composition for wet friction materials, comprising:
    a phenolic resin contained as a major component, the phenolic resin being formed as a result of the reaction between phenols and aldehydes in the presence of a basic catalyst; and
    a particulate filler contained as an additive, the filler having a specific surface area of 35 to 410 m$^2$/g; and
    a coupling agent for enhancing durability of the wet frictional material.

16. The resin composition for wet friction material as claimed in claim 15, wherein the coupling agent is selected from the group comprising γ-glycidoxypropyltrimethoxysilane, β-(3,4-epoxycyclohexyl) ethyltrimethoxysilane, and γ-aminopropyltriethoxysilane.

17. The resin composition for wet friction material as claimed in claim 15, wherein the amount of the coupling agent to be added is preferably 0.1 to 5 wt % relative to the solid content of the resin composition for wet friction material.

18. A wet friction material, comprising:
    a paper body; and
    a binder impregnated into the paper body, the binder being formed of the resin composition claimed in claim 15.

19. A resin composition for wet friction materials, comprising:
    a phenolic resin contained as a major component, the phenolic resin being formed as a result of the reaction between phenols and aldehydes in the presence of a basic catalyst; and
    a particulate filler contained as an additive, the filler having a specific surface area of 35 to 410 m$^2$/g, and the particulate filler being comprised of particles of which surfaces are treated with at least one selected from the group including halogenated silanes, alkoxysilanes, silazanes, and siloxanes.

20. A wet friction material, comprising:
    a paper body; and
    a binder impregnated into the paper body, the binder being formed of the resin composition claimed in claim 19.

* * * * *